United States Patent
Aoyama et al.

(10) Patent No.: US 9,299,366 B2
(45) Date of Patent: Mar. 29, 2016

(54) MAGNETIC RECORDING AND REPRODUCING APPARATUS

(71) Applicant: TDK CORPORATION, Tokyo (JP)

(72) Inventors: Tsutomu Aoyama, Tokyo (JP); Akimasa Kaizu, Tokyo (JP); Tetsuhito Shinohara, Tokyo (JP); Yoshikazu Soeno, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/566,028

(22) Filed: Dec. 10, 2014

(65) Prior Publication Data
US 2015/0170677 A1    Jun. 18, 2015

(30) Foreign Application Priority Data

Dec. 18, 2013  (JP) ................................. 2013-261206
Oct. 24, 2014  (JP) ................................. 2014-217213

(51) Int. Cl.
*G11B 5/66* (2006.01)
*G11B 5/127* (2006.01)
(Continued)

(52) U.S. Cl.
CPC ................ *G11B 5/02* (2013.01); *G11B 5/3116* (2013.01); *G11B 5/3146* (2013.01); *G11B 5/66* (2013.01); *G11B 2005/0024* (2013.01)

(58) Field of Classification Search
CPC ................ G11B 2005/001; G11B 2005/0024; G11B 5/66; G11B 5/493
USPC ......... 360/110, 111, 59, 123.02, 123.05, 325, 360/327; 428/815.2, 818, 819, 820.2
See application file for complete search history.

(56) References Cited

U.S. PATENT DOCUMENTS

| 7,791,838 B2 | 9/2010 | Sato et al. |
| 7,957,098 B2 * | 6/2011 | Yamada ................... G11B 5/02 360/125.3 |

(Continued)

FOREIGN PATENT DOCUMENTS

| JP | A-2005-222675 | 8/2005 |
| JP | A-2007-299460 | 11/2007 |

(Continued)

OTHER PUBLICATIONS

Tanaka, et al., "Micromagnetic Study of Microwave-Assisted Magnetization Reversals of Exhange-Coupled Composite Nanopillars," *IEEE Transactions on Magnetics*, 2013, vol. 49, No. 1, pp. 562-566.

(Continued)

*Primary Examiner* — Thomas Alunkal
(74) *Attorney, Agent, or Firm* — Oliff PLC

(57) ABSTRACT

A magnetic recording and reproducing apparatus includes a magnetic recording medium including a recording layer in which at least two magnetic layers are layered on a non-magnetic substrate; and a magnetic head including a main magnetic pole for applying a recording magnetic field in a direction substantially perpendicular to a recording face of the magnetic recording medium and a microwave generating element that generates a microwave magnetic field. The relationship between a thickness Ts of a magnetic layer having a lowest magnetic anisotropy energy among the at least two magnetic layers composing the recording layer of the magnetic recording medium, and a thickness Tt of the recording layer is Ts/Tt≤0.2. The microwave generating element applies the microwave magnetic field having a width broader than the width of the recording magnetic field generated by the main magnetic pole of the magnetic head to the magnetic recording medium.

4 Claims, 14 Drawing Sheets

(51) Int. Cl.
*G11B 5/02* (2006.01)
*G11B 5/31* (2006.01)
*G11B 5/00* (2006.01)

(56) References Cited

U.S. PATENT DOCUMENTS

| | | | |
|---|---|---|---|
| 8,031,426 B2 * | 10/2011 | Ikeda | G11B 5/314 360/110 |
| 8,139,322 B2 | 3/2012 | Yamada et al. | |
| 8,154,825 B2 * | 4/2012 | Takashita | G11B 5/02 360/125.3 |
| 8,298,688 B2 | 10/2012 | Nemoto et al. | |
| 8,323,808 B2 | 12/2012 | Kitakami et al. | |
| 8,460,805 B1 * | 6/2013 | Gao | G11B 5/66 428/692.1 |
| 8,691,402 B2 | 4/2014 | Kitakami et al. | |
| 2008/0268291 A1 * | 10/2008 | Akiyama | G11B 5/02 428/812 |
| 2009/0310244 A1 * | 12/2009 | Shimazawa | G11B 5/314 360/75 |
| 2011/0019305 A1 * | 1/2011 | Suss | B82Y 10/00 360/110 |
| 2011/0043943 A1 * | 2/2011 | Igarashi | G11B 5/314 360/59 |
| 2011/0216436 A1 * | 9/2011 | Igarashi | G11B 5/314 360/61 |
| 2013/0083428 A1 * | 4/2013 | Kaizu | G11B 5/66 360/125.03 |
| 2013/0286505 A1 * | 10/2013 | Fukuda | G11B 5/78 360/111 |

FOREIGN PATENT DOCUMENTS

| | | |
|---|---|---|
| JP | A-2009-64487 | 3/2009 |
| JP | A-2011-113604 | 6/2011 |

OTHER PUBLICATIONS

Tang, et al., "Narrow Track Confinement by AC Filed Generation Layer in Microwave Assisted Magnetic Recording," *IEEE Transactions on Magnetics*, 2008, vol. 44, No. 11, pp. 3376-3379.

* cited by examiner

MAGNETIC RECORDING AND REPRODUCING APPARATUS

BACKGROUND OF THE INVENTION

1. Field of the Invention

The present invention relates to magnetic recording and reproducing apparatuses. More particularly, the present invention relates to a magnetic recording and reproducing apparatus using a microwave assisted recording method.

2. Description of the Related Art

Improvement of the performance of magnetic recording media and magnetic heads is desirable in hard disk apparatuses in order to increase magnetic recording densities. In the increase of the recording densities in the magnetic recording media, it is necessary to decrease the size of magnetic particles composing recording layers of the magnetic recording media in order to ensure signal to noise ratios (SNRs) desired for reproduction. However, the decrease in the size of the magnetic particles reduces the volume of the magnetic particles and thus disappearance of magnetization caused by thermal fluctuation may occur more frequently.

In order to prevent the disappearance of magnetization caused by the thermal fluctuation and to keep a stable recording state, it is desirable to increase magnetic anisotropy energy (hereinafter sometimes simply referred to as Ku) of the magnetic particles composing the recording layers of the magnetic recording media. The magnitude of the magnetic field to reverse the magnetization in the magnetic particles having uniaxial magnetic anisotropy is called magnetic anisotropy field Hk and is represented by $Hk=2Ku/Ms$ where Ms denotes saturation magnetization. Accordingly, when a material having a high Ku is used, the magnetic anisotropy field Hk is increased and a strong recording magnetic field may be required for the recording on the magnetic recording media.

In contrast, since the strength of the magnetic fields generated by the magnetic heads is restricted by the materials and the shapes of the magnetic heads, it may be difficult to perform the recording in some cases.

In order to address such technical problems, exchange coupled composite (ECC) media are being considered. The ECC medium has magnetic layers of different magnetic properties, that is, a high Ku magnetic layer and a low Ku magnetic layer. In the ECC medium, the coupling force between the magnetic layers is controlled to reduce the recording reversed magnetic field of the magnetic recording medium while keeping thermal stability (refer to Japanese Unexamined Patent Application Publication No. 2005-222675 and Japanese Unexamined Patent Application Publication No. 2011-113604).

In addition, energy assisted recording is proposed in which energy is supplementarily applied to the magnetic recording media during the recording, thereby causing effective recording magnetic field strength to be reduced. A recording method using a microwave magnetic field as an auxiliary energy source is called microwave assisted magnetic recording (MAMR). Research and development of the MAMR is advanced for practical use.

Examples of the microwave assisted magnetic recording method include a method in which a spin torque oscillator (STO) composed of magnetic thin films of multiple layers is formed in a magnetic gap between a main magnetic pole composing a recording element of the magnetic head and a trailing shield, the microwave magnetic field in an in-plane direction is generated by self oscillating of the STO, and the microwave magnetic field is applied to the magnetic recording medium to induce magnetization precession, thereby assisting the perpendicular magnetization reversal. Specifically, a field generating layer (FGL) of the STO composed of the magnetic thin films of multiple layers is subjected to the self oscillating at a high frequency and a leaked magnetic field generating from the surface of the FGL is applied to the magnetic recording medium, thereby assisting the magnetization reversal with the microwave. This assist method is called a self oscillating microwave assisted magnetic recording method (refer to Japanese Unexamined Patent Application Publication No. 2009-064487).

Another example of the microwave assisted magnetic recording method other than the self oscillating microwave assisted magnetic recording method is an externally oscillated microwave assisted magnetic recording method. An apparatus using the method has been devised in which a strip line is arranged near the main magnetic pole of the magnetic head, high-frequency current in a microwave band is externally passed through the strip line to generate a high-frequency in-plane magnetic field near the main magnetic pole, and the high-frequency in-plan magnetic field is superposed on the perpendicular recording magnetic field generated by the main magnetic pole to assist the magnetization reversal (refer to Japanese Unexamined Patent Application Publication No. 2007-299460).

In order to increase the recording density, it is necessary to reduce the bit length (magnetization reversal interval) of a recording signal and narrow down a recording track width. The possibility of reducing the magnetic field strength to be used for the magnetization reversal of a high magnetic anisotropy energy medium that is microparticulated by using a combination of the ECC medium and the microwave assisted magnetic recording method is known (refer to T. Tanaka, N. Narita, A. Kato, Y. Nozaki, Y. Hong, and K. Matsuyama, "Micormagnetic Study of Microwave-Assisted Magnetization Reversals of Exchange-Coupled Composite Nanopillars", IEEE Transactions on Magnetics, vol 49, No. 1, 562 (2013)). However, although the reduction in the magnetic field to be used for the magnetization reversal enables the recording on the high magnetic anisotropy energy medium, spread of the recording in the track width direction may easily occur concurrently, which causes a problem in that improvement of the track density is difficult. There has not been found any useful means for realizing the narrow recording track width other than a method of decreasing the size of an element that generates the microwave so as to minimize the strength distribution of the microwave (refer to Y. Tang and J. G. Zhu, "Narrow track confinement by AC field generation layer in microwave assisted recording" IEEE Transactions on Magnetics, vol 44 No. 11 3376 (2008)).

Specifically, in the externally oscillated microwave assisted magnetic recording method using the microwave generated by a microstrip line arranged near the main magnetic pole of the magnetic head, preferable specifications of the recording layer of the ECC medium that concurrently realizes high SNR and the narrow recording track width and the method of applying the microwave are not clear.

SUMMARY OF THE INVENTION

In order to address the above problems, the present invention is made to provide a magnetic recording and reproducing apparatus that optimizes the ECC medium and the method of applying the microwave appropriate for the microwave assisted magnetic recording to concurrently realize the high SNR and the narrow track width.

According to an embodiment of the present invention, a magnetic recording and reproducing apparatus includes a magnetic recording medium and a magnetic head. The magnetic recording medium includes a recording layer in which at least two magnetic layers are layered on a non-magnetic substrate. The magnetic head includes a main magnetic pole for applying a recording magnetic field in a direction substantially perpendicular to a recording face of the magnetic recording medium and a microwave generating element that generates a microwave magnetic field. The relationship between a thickness Ts of a magnetic layer having a lowest magnetic anisotropy energy among the at least two magnetic layers composing the recording layer of the magnetic recording medium, and a thickness Tt of the recording layer is Ts/Tt≤0.2. The microwave generating element applies the microwave magnetic field having a width broader than the width of the recording magnetic field generated by the main magnetic pole of the magnetic head to the magnetic recording medium.

With the above magnetic recording and reproducing apparatus, it is possible to achieve both the high SNR and the narrow track width by superposing the microwave magnetic field having a width broader than that of the recording magnetic field generated by the main magnetic pole of the magnetic head in a direction substantially horizontal to the recording face of the magnetic recording medium.

In the magnetic recording and reproducing apparatus, the microwave generating element is preferably a strip line the width of which at a tip at a medium opposing face side in a track width direction is longer than the width of the main magnetic pole in the track width direction.

With the above magnetic recording and reproducing apparatus, passing microwave current through the strip line in the track width direction of the recording region allows the microwave magnetic field having a uniform strength and a uniform oscillation direction to be applied to improve the high SNR.

In the magnetic recording and reproducing apparatus, the relationship between a microwave magnetic field strength Hac at a position corresponding to a center position of a trailing end of the main magnetic pole at a center position of the recording layer in a thickness direction and an effective magnetic anisotropy field Hk_eff of the recording layer is preferably Hac≤Hk_eff/10.

With the above magnetic recording and reproducing apparatus, when the microwave magnetic field is superposed on the recording magnetic field generated by the main magnetic pole of the magnetic head to perform continuous recording on the track, it is possible to suppress the effect on adjacent tracks while keeping the high SNR.

In the magnetic recording and reproducing apparatus, the effective magnetic anisotropy field Hk_eff of the recording layer of the magnetic recording medium is preferably 10 kOe≤Hk_eff≤30 kOe.

With the above magnetic recording and reproducing apparatus, when the microwave magnetic field is superposed on the recording magnetic field generated by the main magnetic pole of the magnetic head for recording, it is possible to prevent loss of the recorded information due to the thermal fluctuation to realize recording of information at the high SNR.

According to the present invention, it is possible to provide the magnetic recording and reproducing apparatus capable of concurrently realizing the high SNR and the narrow track width by optimizing the ECC medium and the method of applying the microwave appropriate for the microwave assisted magnetic recording.

DESCRIPTION OF THE PREFERRED EMBODIMENTS

Embodiments of the present invention will herein be described in detail with reference to the attached drawings. The present invention is not limited by the content described in the embodiments. Components described below include components easily effected by persons skilled in the art, practically identical components, and components within an equivalent range. The components described below may be appropriately combined. Omission, replacement, or modification of the components may be made within the spirit and scope of the present invention.

EMBODIMENTS

Figure 1A:
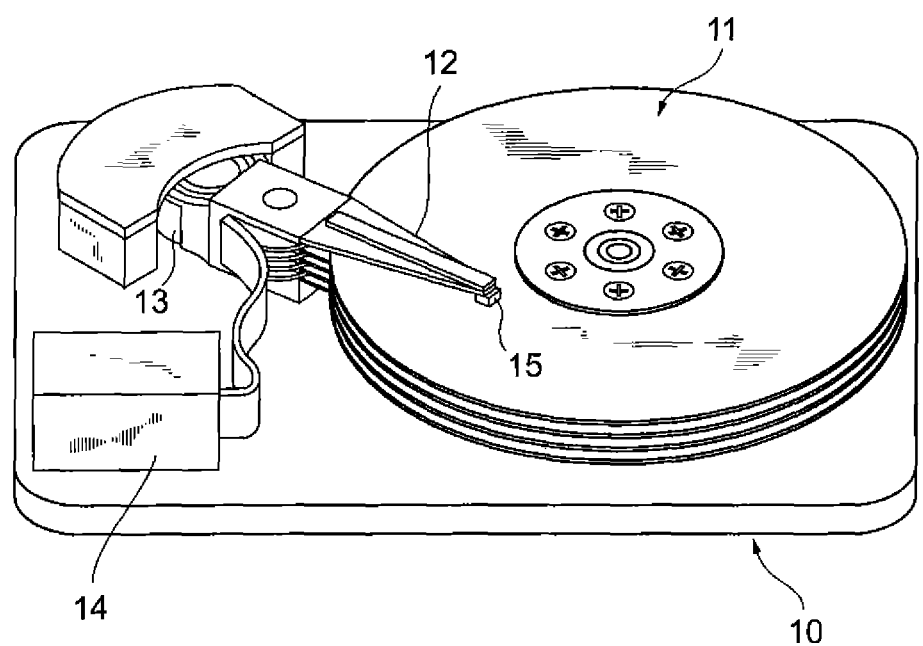
FIG. 1A illustrates an example of the entire arrangement of a magnetic recording and reproducing apparatus according to an embodiment.

FIG. 1A illustrates an example of the entire arrangement of a magnetic recording and reproducing apparatus 10 according to an embodiment. The magnetic recording and reproducing apparatus 10 includes a perpendicular-recording magnetic recording medium 11 and a perpendicular-recording magnetic head 15 that is placed closely to the surface of the magnetic recording medium 11 so as to be capable of being floated over the surface of the magnetic recording medium 11 in order to record and reproduce a magnetic signal on the magnetic recording medium 11. A control circuit 14 turns a driving arm 12 using a voice coil motor 13 as a drive source to move the magnetic head 15 to a certain area on the magnetic recording medium 11 for a certain recording and reproduction operation.

Figure 1B:
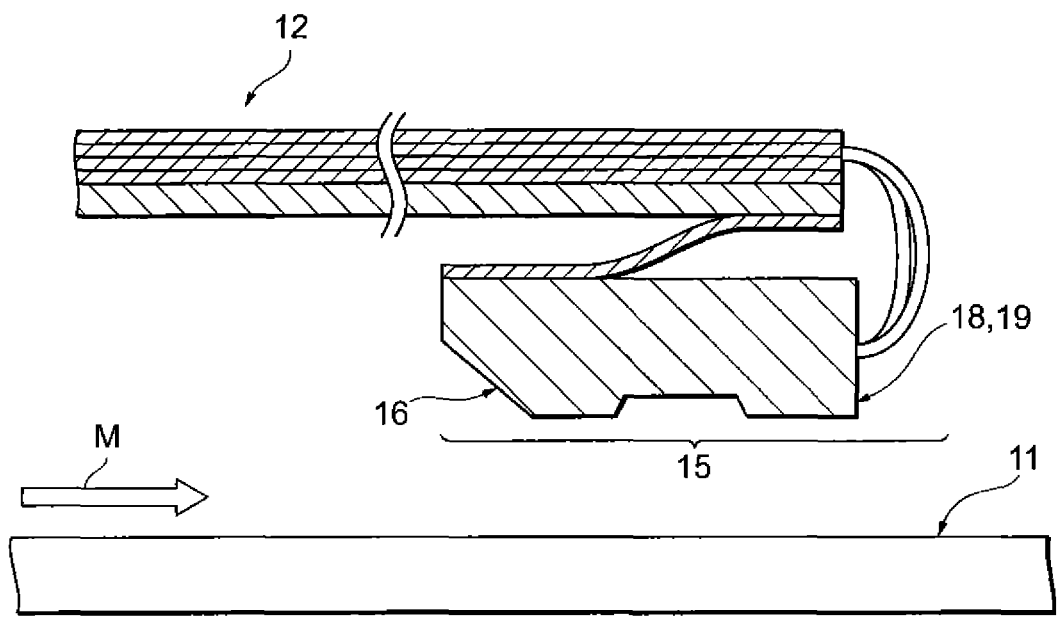
FIG. 1B is a diagram illustrating an exemplary detailed structure of a driving arm and a magnetic head in the magnetic recording and reproducing apparatus in FIG. 1A.

As illustrated in FIG. 1B, the magnetic head 15 is provided at a tip of the driving arm 12 so as to oppose the magnetic recording medium 11.

Figure 1C:
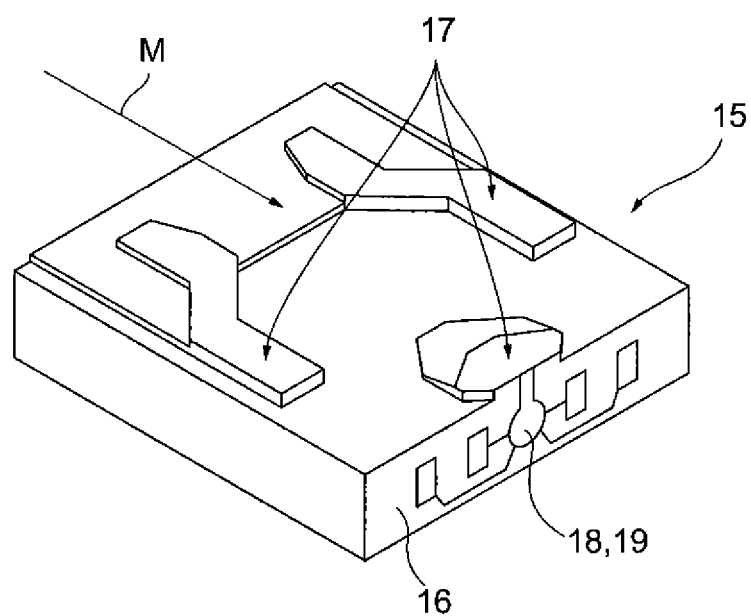
FIG. 1C is a diagram illustrating an exemplary detailed structure of a reproduction head portion and a recording head portion, which is part of the magnetic head in the magnetic recording and reproducing apparatus in FIG. 1A.

FIG. 1C is a diagram of the magnetic head 15, viewed from a face opposing the magnetic recording medium 11 (hereinafter referred to as a medium opposing face). The magnetic head 15 includes a slider base 16 having a substantially rectangular parallelepiped structure. The slider base 16 includes an air sliding face 17 directly involved in floating properties. The slider base 16 includes a reproduction head portion 18 and a recording head portion 19 on a side end face that exists on a rear side of the movement direction of the magnetic head 15 opposing a movement direction M of the magnetic recording medium 11.

Figure 2:
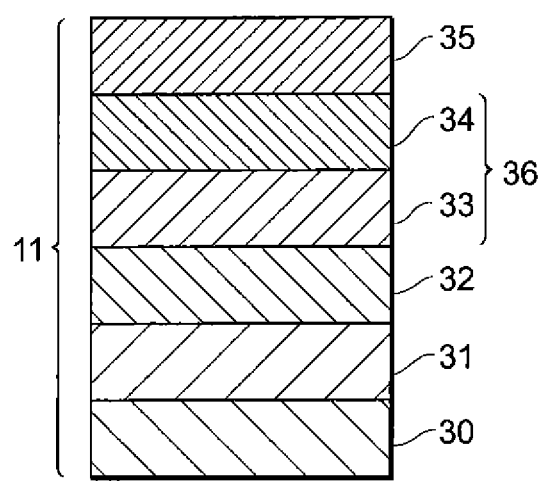
FIG. 2 is an exemplary schematic cross-sectional view of a magnetic recording medium in the magnetic recording and reproducing apparatus in FIG. 1A.

As illustrated in FIG. 2, the magnetic recording medium 11 is formed of a first magnetic layer 33 that is provided on a non-magnetic substrate 30 with a soft magnetic under layer 31 and a non-magnetic seed layer 32 sandwiched therebetween and that has perpendicular magnetic anisotropy, a second magnetic layer 34 that has the perpendicular magnetic anisotropy having magnetic anisotropy energy lower than that of the first magnetic layer 33, and a protective layer 35.

The substrate 30 may be made of a non-magnetic material, such as glass, an Al alloy coated with NiP, Si, or $Al_2O_3$.

The soft magnetic under layer 31 may be made of a material, such as a Fe alloy, a Co amorphous alloy, or ferrite. The soft magnetic under layer 31 may have a layered structure of soft-magnetic layers and non-magnetic layers.

The first magnetic layer 33 and the second magnetic layer 34 may be made of, for example, an alloy of Co and Cr such as a CoCrPt alloy, an alloy of Co and Pt, an alloy of Co and Pd, an alloy of Fe and Pt, an alloy of Fe and Co, a layered product of the alloys, or a material containing ferromagnetic particles of, for example, CoPt in a matrix pattern in an oxide material, such as $SiO_2$. A recording layer 36 composed of the first magnetic layer 33 and the second magnetic layer 34 is oriented so as to be magnetized in a direction perpendicular to the surface of the magnetic recording medium 11. Varying the ratio of the elements composing these magnetic layers allows the magnitude of the magnetic anisotropy energy of the magnetic layers to be controlled. For example, in the case of a CoCrPt alloy, increasing the ratio of Pt increases the magnetic anisotropy energy. Since addition of a non-magnetic element, such as Ta, B, Nb, N, or Cu, varies the crystallinity and the orientation of the ferromagnetic particles composing the magnetic layers, the magnetic anisotropy energy is controlled so as to have an arbitrary magnitude. It is possible to adjust the magnetic anisotropy energies of the first magnetic layer 33 and the second magnetic layer 34 so as to have appropriate magnitudes in the above manner. It is preferred that 15 kOe≤Hk_h≤50 kOe and 10 Oe≤Hk_s≤1000 Oe where Hk_h denotes the magnetic anisotropy field of the first magnetic layer 33, which is a magnetic layer having high anisotropy, and Hk_s denotes the magnetic anisotropy field of the second magnetic layer 34, which is a magnetic layer having low anisotropy.

Figure 3A:
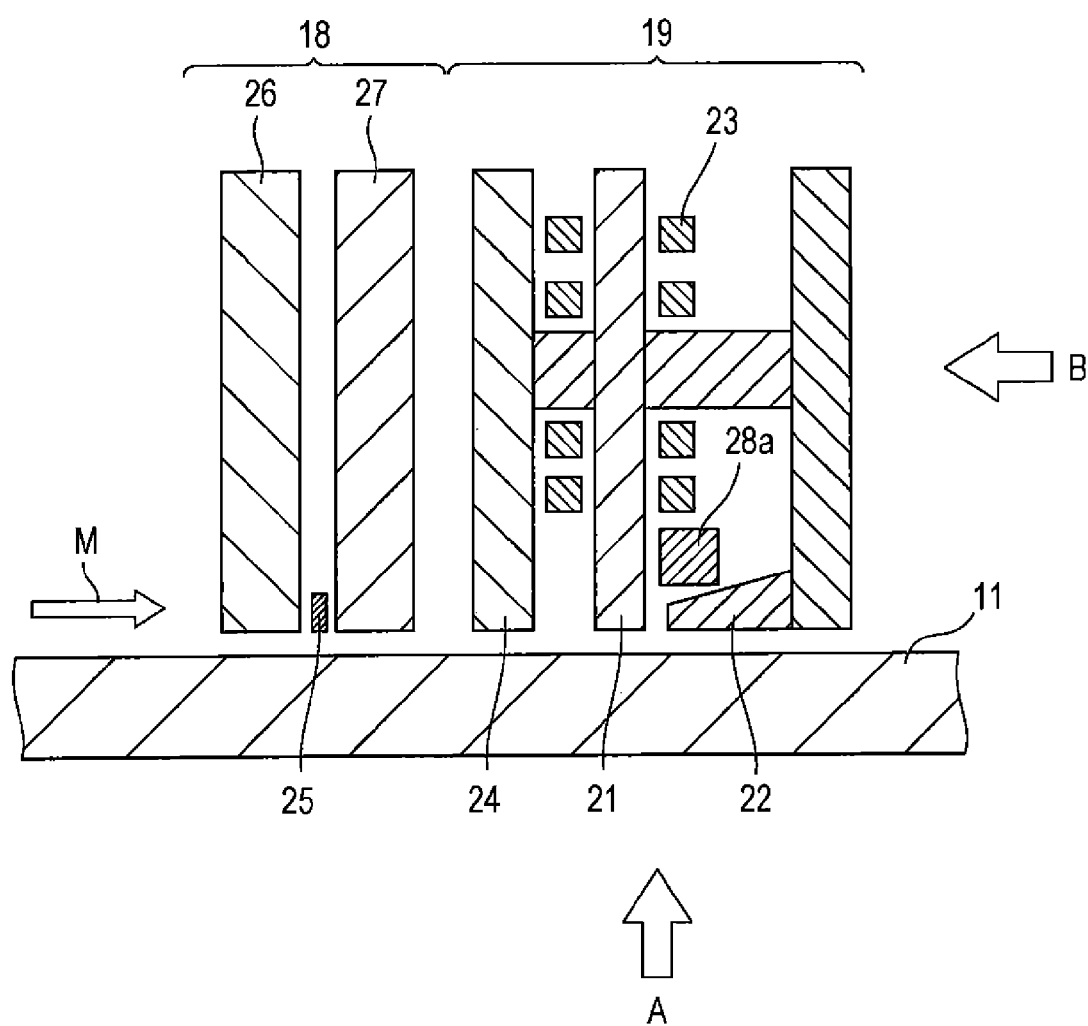
FIG. 3A is an exemplary cross-sectional view of the reproduction head portion and the recording head portion in FIG. 1C.

As illustrated in FIG. 3A, the magnetic head 15 is composed of the reproduction head portion 18 and the recording head portion 19. The reproduction head portion 18 is placed at the front side of the recording head portion 19 (the front side in the relative movement direction of the magnetic head 15 opposing the movement direction M of the magnetic recording medium 11). The reproduction head portion 18 includes an MR element 25, a front-end lead shield 26 placed at the front side of the MR element 25, and a back-end lead shield 27 placed at the rear side of the MR element 25 (the rear side of the relative movement direction of the magnetic head 15 opposing the movement direction M of the magnetic recording medium 11).

The recording head portion 19 includes a main magnetic pole 21 for applying the recording magnetic field in a direction substantially perpendicular to a recording face of the magnetic recording medium 11, a write coil 23 for exciting the main magnetic pole 21, a leading shield 24 placed at the front side of the main magnetic pole 21, and a trailing shield 22 placed at the rear side of the main magnetic pole 21.

The main magnetic pole 21 may be made of a soft-magnetic material, such as an alloy of Co, an alloy of Fe, an alloy of Fe and Co, an alloy of Fe and Ni, an alloy of Fe and N, or an alloy of Fe and Al.

A strip line 28 is a microwave generating element. Passing microwave current through the strip line 28 generates a microwave magnetic field that oscillates in the in-plane direction of the magnetic recording medium 11 from a tip 28a of the strip line 28 (hereinafter referred to as a strip line tip 28a).

Figure 3B:
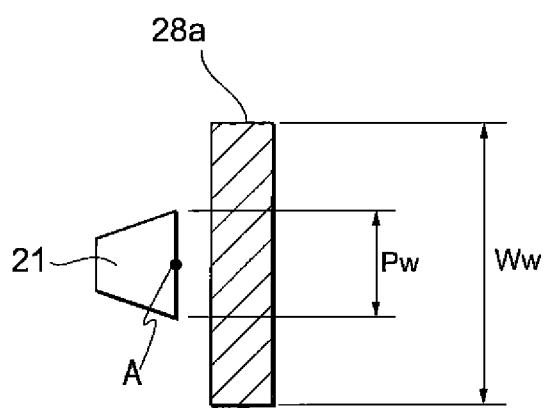
FIG. 3B illustrates an example of the shapes of a main magnetic pole and the tip of a strip line, viewed from a direction A in FIG. 3A.

FIG. 3B is a diagram illustrating position and size relationship between the main magnetic pole 21 and the strip line tip 28a when the diagram in FIG. 3A is viewed from a direction A, which corresponds to the medium opposing face. Referring to FIG. 3B, Pw denotes a width in a track width direction on the medium opposing face of the main magnetic pole 21 and Ww denotes a length in the track width direction of a portion parallel to the medium opposing face of the strip line tip 28a.

Figure 3C:
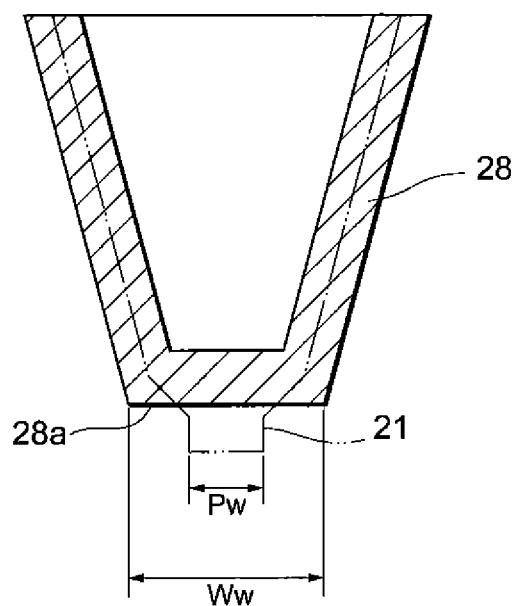
FIG. 3C illustrates an example of the shapes of the main magnetic pole and the strip line at a medium opposing face side, viewed from a direction B in FIG. 3A.

FIG. 3C is a diagram illustrating position and size relationship between the main magnetic pole 21 and the strip line 28 when the diagram in FIG. 3A is viewed from a direction B, which opposes the movement direction M of the magnetic recording medium 11. Referring to FIG. 3C, Pw denotes the width in the track width direction on the medium opposing face of the main magnetic pole 21 and Ww denotes the length in the track width direction of the portion parallel to the medium opposing face of the strip line tip 28a.

The strip line 28, which is the microwave generating element, applies the microwave magnetic field having a width broader than that of the recording magnetic field generated by the main magnetic pole 21 to the magnetic recording medium 11. Passing the microwave current through the strip line tip 28a the length Ww of which is longer than the width Pw of the main magnetic pole 21 allows the microwave magnetic field that has a uniform strength and a uniform oscillation direction and that has a width broader than that of the magnetic field generated by the main magnetic pole 21 to be generated in a region of the recording track width. The uniform strength and the uniform oscillation direction are important in terms of formation of a magnetization reversal region along the distribution of the recording magnetic field generated by the main magnetic pole 21. The strip line tip having a length shorter than the width of the main magnetic pole is not preferred because the microwave having a non-uniform strength and a non-uniform oscillation direction is generated from a bending portion of the strip line.

The magnetic recording medium 11 is designed so as to meet the following equation (1):

$$Ts/Tt \leq 0.2 \qquad (1)$$

where Ts denotes the thickness of the second magnetic layer 34 having the lowest magnetic anisotropy energy and Tt denotes the thickness of the recording layer 36.

The application of the microwave magnetic field within this thickness range for recording allows a narrow recording track width and a high SNR to be realized.

In order to realize the improvement of the SNR and the narrow recording track width when the microwave magnetic field is applied, the relationship between a microwave magnetic field strength (Hac) at a position corresponding to a center position A of a trailing end of the main magnetic pole 21 at the center position of the recording layer 36 in the thickness direction (a position immediately below the center position A) and an effective magnetic anisotropy field (Hk_eff) desirably meets the following equation (2):

$$Hac \leq Hk\_eff/10 \quad (2)$$

The center position A of the trailing end of the main magnetic pole 21 is the center position in the track width direction at the trailing end, which is an end at the rear side of the main magnetic pole 21 (at the rear side of the relative movement direction of the magnetic head 15 opposing the movement direction M of the magnetic recording medium 11), as illustrated in FIG. 3B.

In order to realize the narrow recording track width and the high SNR when the microwave magnetic field is applied, the effective magnetic anisotropy field Hk_eff of the recording layer 36 desirably meets the following equation (3):

$$10 \text{ kOe} \leq Hk\_eff \leq 30 \text{ kOe} \quad (3)$$

The reason why the ranges indicated in the equations (1) to (3) are desirable will now be described.

First Simulation Example

In order to determine a microwave assist effect in the magnetization reversal of the magnetic recording medium 11, the magnetization state of the recording layer 36 of the magnetic recording medium 11 was analyzed using an Landau-Lifshitz-Gilbert (LLG) equation (4):

$$\frac{dM}{dt} = -\gamma M \times H_{eff} + \frac{\alpha}{M} M \times \frac{dM}{dt} \quad (4)$$

where γ denotes a gyromagnetic constant and α denotes a damping constant. An effective magnetic field Heff is composed of the sum of five components: the magnetic anisotropy field Ha (=Hkcos θ, θ denotes an angle between the magnetization and an easy axis of magnetization), a demagnetizing field Hd, an external magnetic field Hdc, a thermal magnetic field Hh, and the microwave magnetic field strength Hac. A plane parallel to the magnetic recording medium 11 was defined as an x-y plane, the movement direction of the head was denoted by x, and the track width direction was denoted by y. The microwave magnetic field strength Hac was applied as a linearly polarized magnetic field that oscillates in the x direction on the x-y plane.

The recording layer 36 was defined as an aggregate of the 2,048 magnetic particles and was defined as a model that has 10% dispersion in the magnitude of the magnetic anisotropy field Hk and two-degree dispersion in the angle thereof. Hk_eff was defined as the total effective magnetic anisotropy field of the recording layer 36 and was defined so as to have the magnetic field strength at which the external magnetic field Hdc is applied in the in-plane direction of the recording layer 36, which is a hard axis of magnetization, to saturate the magnetization of the recording layer 36 in the in-plane direction.

The recording layer 36 was defined so as to have a structure in which the two magnetic layers having different magnetic anisotropy energies are layered. The thickness of the second magnetic layer 34 (the low anisotropy magnetic layer) having the lowest magnetic anisotropy energy was denoted by Ts, the thickness of the first magnetic layer 33 (the high anisotropy magnetic layer) having the highest magnetic anisotropy energy was denoted by Th, and an exchange coupling constant J between the layers was set to 2 erg/cm². As for the magnetic properties of the respective magnetic layers, the values of Hk_h, Ms_h, Hk_s, Ms_s, and J was varied within a range of 15 kOe≤Hk_h≤50 kOe and a range of 10 Oe≤Hk_s≤1000 Oe so that the effective magnetic anisotropy field Hk_eff has a certain value depending on the content of the analysis. The high anisotropy magnetic layer was based on Hk_h=20 kOe and Ms_h=600 emu/cc and the low anisotropy magnetic layer was based on Hk_s=50 Oe and Ms_s=1000 emu/cc. The average particle distance was set to 7.5 nm, the particle size is set so as to have 9% dispersion, and the filling rate was set to 70%.

In recording simulation, a single-magnetic-pole perpendicular-recording head was modeled, three-dimensional magnetic field distribution was calculated with a finite element method, and the calculated three-dimensional magnetic field distribution was used as the recording magnetic field of the head. The microwave magnetic field is generated by passing high-frequency current through the strip line the length of which is longer than the width of the main magnetic pole 21 in the track width direction. The microwave magnetic field was applied as the linearly polarized magnetic field that has a uniform strength in an analysis region (240 nm×480 nm) and that oscillates in the direction in which the head moves. In reproduction simulation, a tunnel magnetic resistance (TMR) head was modeled and the simulation was performed using reproduction sensitivity distribution calculated with the finite element method.

Recording and reproduction simulation was performed in the following procedure:

1) Initial magnetization of the recording layer 36 is performed at random (alternating current demagnetized state) and a signal of 525 kfci (the magnetization reversal interval: 48.4 nm) is recorded at the center of the analysis region.

2) The width of a region where the signal of 525 kfci is recorded is analyzed from the magnetization pattern after the recording on the recording layer 36 to calculate a magnetic write width (MWW).

3) Output voltage S and noise voltage N are analyzed in the reproduction simulation and the SNR is calculated as 20 log (S/N) to use the calculated SNR as a single-track recording SNR.

4) A signal of 368 kfci (the magnetization reversal interval: 69.0 nm) is recorded at a position shifted from the center of the track that has been first recorded by ±50 nm.

5) The output voltage S and the noise voltage N of the track that has been first recorded are analyzed in the reproduction simulation and the SNR is calculated as 20 log (S/N) to use the calculated SNR as a three-track recording SNR.

6) The amount of variation of the signal quality caused by the recording on adjacent tracks is calculated from the difference between the single-track recording SNR and the three-track recording SNR. The amount of variation of the signal quality is used to evaluate the effective recording track widths in the respective recording conditions.

Figure 4:
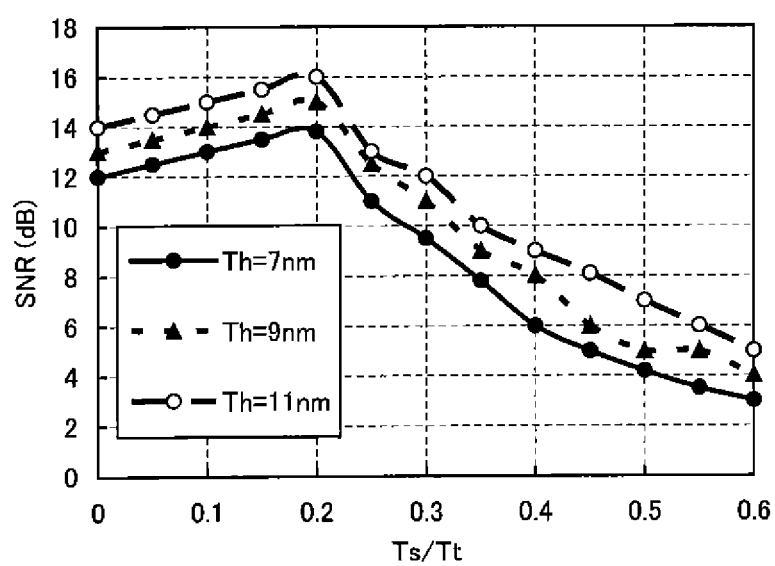
FIG. 4 is a graph illustrating a result of simulation of an SNR when the proportion of Ts to Tt is varied.

FIG. 4 is a graph illustrating a result of simulation of the SNR when the proportion of Ts to Tt was varied. The sizes of the magnetic anisotropy field Hk_s of the low anisotropy magnetic layer and the magnetic anisotropy field Hk_h of the high anisotropy magnetic layer and the exchange coupling constant J between the magnetic layers were adjusted to set the total effective magnetic anisotropy field Hk_eff of the recording layer 36 so as to have a value of 10 kOe when the thickness Th of the high anisotropy magnetic layer was varied between 7 nm, 9 nm, and 11 nm. The microwave magnetic field is the linearly polarized radio-frequency magnetic field generated from the strip line the length of which is longer than the width of the main magnetic pole 21 in the track width direction. The microwave magnetic field was applied to the entire analysis region at a strength of 500 Oe and at a frequency of 10 GHz.

A Ts/Tt range appropriate for achievement of the improvement effect of the SNR by the application of the microwave exists because the SNR depends on Ts\Tt and this Ts/Tt range was effective in the case of the equation (1).

The results of analysis when the thickness Th of the high anisotropy magnetic layer was varied between 7 nm, 9 nm, and 11 nm were substantially equal to each other in the range of the equation (1) and the above results were established regardless of the value of the thickness Th of the high anisotropy magnetic layer.

In a region where Ts/Tt is higher than 0.2, the SNR was decreased with the increasing Ts/Tt. The increase in the thickness Ts of the low anisotropy magnetic layer increased the effect of the low anisotropy magnetic layer even with the same effective magnetic anisotropy field Hk_eff. Since the increase in Ts/Tt increased the magnetization reversal probability of the low anisotropy magnetic layer, caused the magnetization reversal of the magnetic particles in low magnetic field components of the recording magnetic field of the head, and extended a magnetic transition region in which the magnetization direction of the magnetic particles is reversed into reverse polarity, the SNR was decreased. As a result, an optimal Ts/Tt value appears. In a region where Ts/Tt is lower than 0.2, the decrease in Ts/Tt decreased the SNR but the higher SNR was achieved even when Ts/Tt=0.05, compared with the SNR when Ts/Tt=0, thereby offering the advantage of the embodiment.

Figure 5:
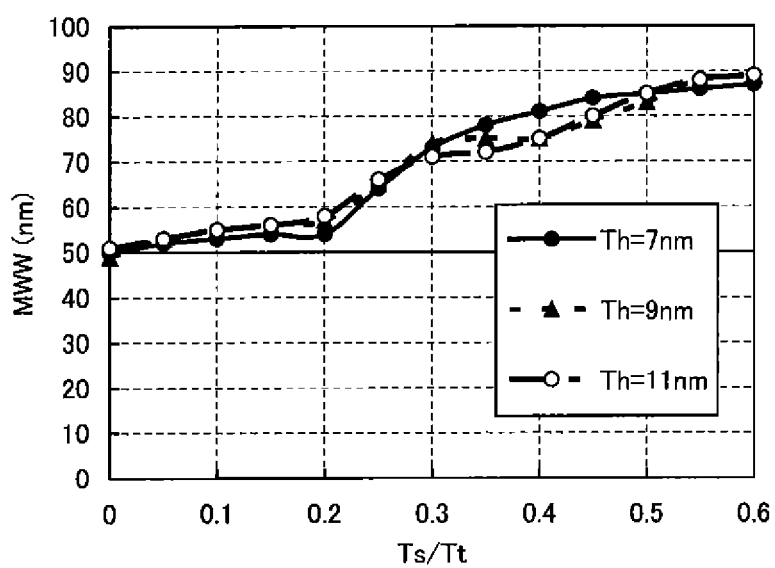
FIG. 5 is a graph illustrating a result of simulation of a magnetic write width when the proportion of Ts to Tt is varied.

FIG. 5 is a graph illustrating a result of simulation of the magnetic write width (MWW) when the proportion of Ts to Tt was varied. In the range of the equation (1), although the magnetic write width MWW was increased with the increasing Ts/Tt, the amount of variation with respect to the value when Ts/Tt=0 was about 10% at a maximum.

In a region where Ts/Tt is higher than 0.2, the rate of the increase in the magnetic write width MWW to the increase in Ts/Tt was higher than that in the range of the equation (1). The increase in the thickness of the low anisotropy magnetic layer increased the effect of the low anisotropy magnetic layer of the magnetic recording medium even with the same effective magnetic anisotropy field Hk_eff. The magnetization reversal probability of the low anisotropy magnetic layer was increased even with the same effective magnetic anisotropy field Hk_eff to increase the recording track width. The optimal Ts/Tt value appears for this reason.

Second Simulation Example

The relationship between the microwave magnetic field strength Hac and the SNR was analyzed for the medium models of five kinds in which the effective magnetic anisotropy field Hk_eff of the recording layer 36 of the magnetic recording medium 11 has values of 8 kOe, 10 kOe, 20 kOe, 30 kOe, and 40 kOe by using the method described in the first simulation example. The thickness Ts of the low anisotropy magnetic layer layered on the high anisotropy magnetic layer having the magnetic anisotropy field Hk of five levels (Hk=15 kOe, 20 kOe, 30 kOe, 40 kOe, and 50 kOe), the magnetic anisotropy field Hk_s, and the exchange coupling constant J between the magnetic layers were set so that the effective magnetic anisotropy field Hk_eff has the values of 8 kOe, 10 kOe, 20 kOe, 30 kOe, and 40 kOe, respectively.

Figure 6:
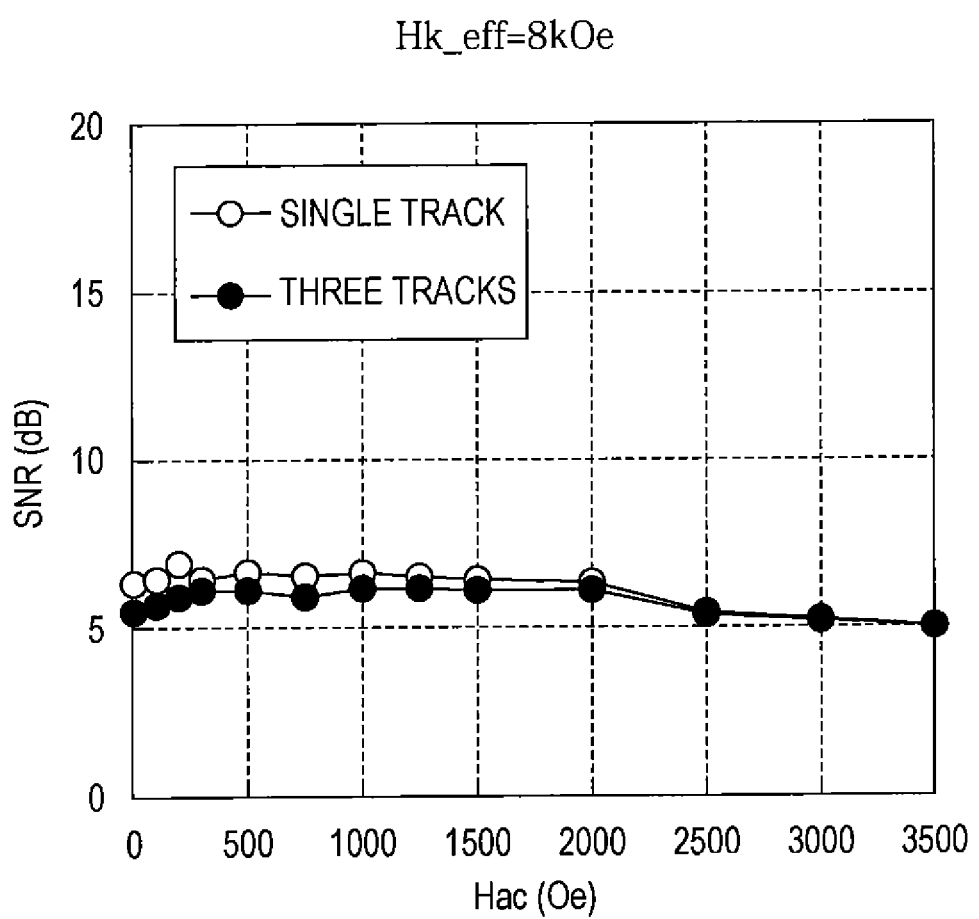
FIG. 6 is a graph illustrating a result of simulation (Hk_eff=8 kOe) of the SNR when a microwave magnetic field strength Hac is varied.

FIG. 6 is a graph illustrating a result of simulation of the relationship between the microwave magnetic field strength Hac and the SNR in a magnetic recording medium model in which Hk_eff=8 kOe. The SNR was lower than 10 dB regardless of the strength of the microwave. This may be because, since the magnetic anisotropy energy of the recording layer 36 is low in the magnetic recording medium in which Hk_eff=8 kOe, the magnetization of the magnetic particles becomes unstable due to the effect of the thermal fluctuation to vary the magnetization of the magnetic particles in the magnetic transition region at random.

Figure 7:
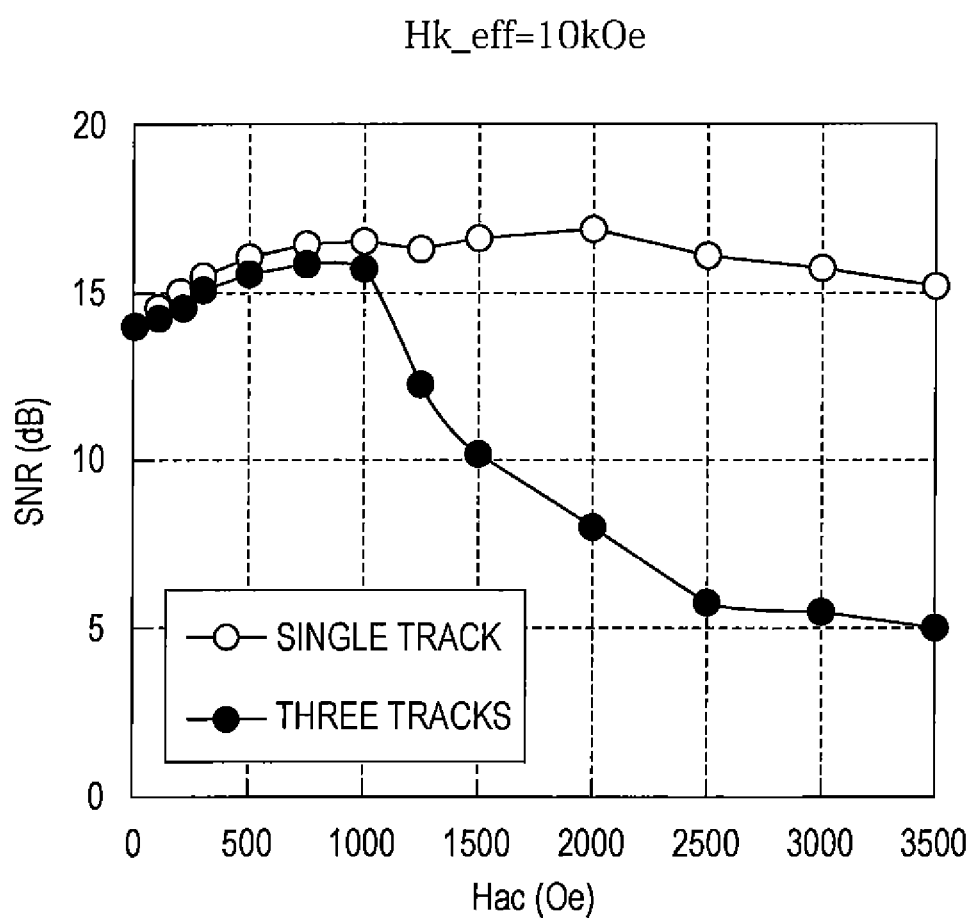
FIG. 7 is a graph illustrating a result of simulation (Hk_eff=10 kOe) of the SNR when the microwave magnetic field strength Hac is varied.

FIG. 7 is a graph illustrating a result of simulation of the relationship between the microwave magnetic field strength Hac and the SNR in a magnetic recording medium model in which Hk_eff=10 kOe. The SNR was increased both in the single-track recording and the three-track recording with the increasing microwave magnetic field strength Hac in a region where the microwave magnetic field strength Hac is lower than or equal to 1000 Oe. However, in a region where the microwave magnetic field strength Hac exceeds 1000 Oe, the variation in the SNR is small in the single-track recording while the SNR is decreased with the increasing microwave magnetic field strength Hac in the three-track recording. This may be because the increase in the microwave magnetic field strength Hac causes the magnetization reversal probability of the magnetic particles to be increased to increase the recording track width.

Figure 8:
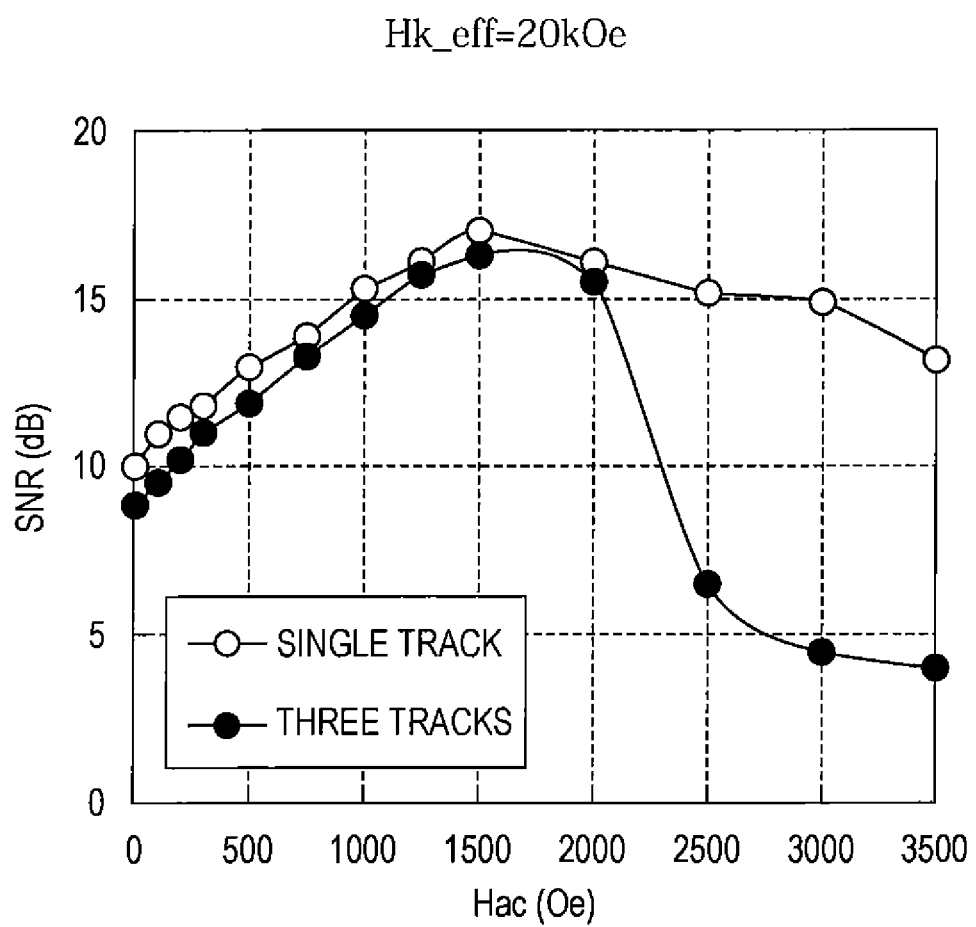
FIG. 8 is a graph illustrating a result of simulation (Hk≤eff=20 kOe) of the SNR when the microwave magnetic field strength Hac is varied.

FIG. 8 is a graph illustrating a result of simulation of the relationship between the microwave magnetic field strength Hac and the SNR in a magnetic recording medium model in which Hk_eff=20 kOe. The SNR was increased both in the single-track recording and the three-track recording with the increasing microwave magnetic field strength Hac in a region where the microwave magnetic field strength Hac is lower than or equal to 2000 Oe. However, in a region where the microwave magnetic field strength Hac exceeds 2000 Oe, the SNR was decreased with the increasing microwave magnetic field strength Hac both in the single-track recording and the three-track recording. The rate of the decrease in the SNR in the three-track recording is higher than that in the single-track recording. This may be because the increase in the microwave magnetic field strength Hac causes the magnetization reversal probability of the magnetic particles to be increased to increase the recording track width.

Figure 9:
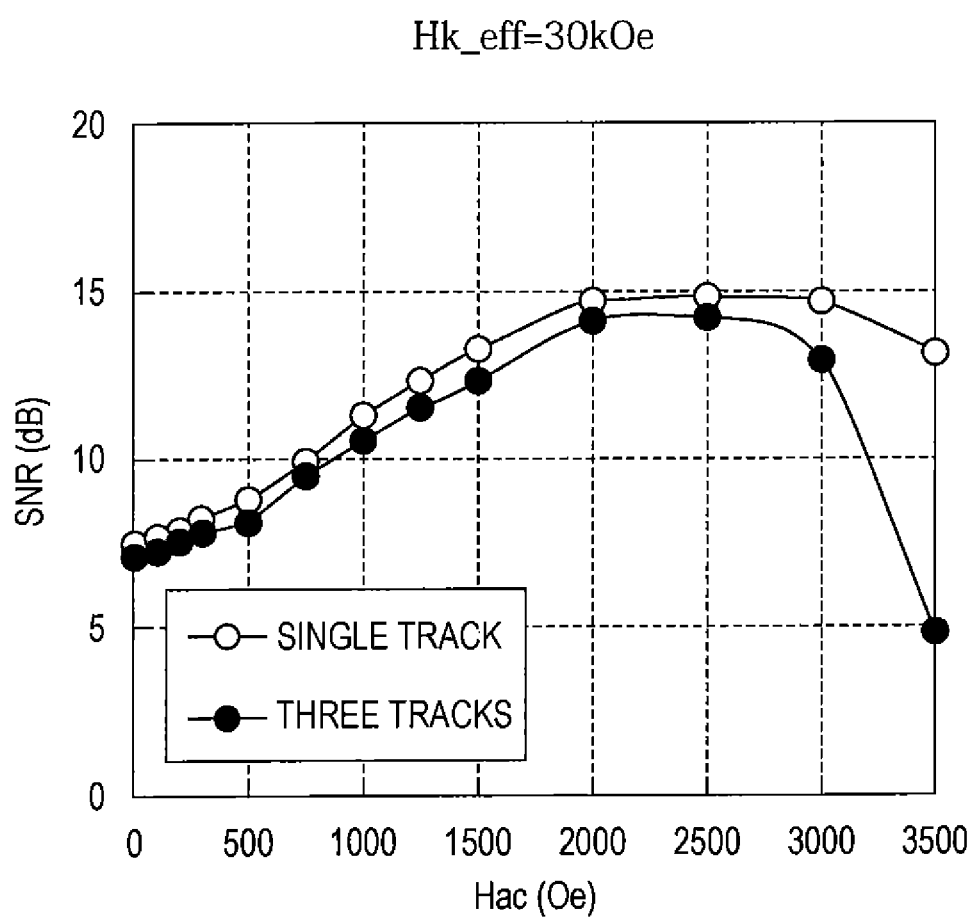
FIG. 9 is a graph illustrating a result of simulation (Hk_eff=30 kOe) of the SNR when the microwave magnetic field strength Hac is varied.

FIG. 9 is a graph illustrating a result of simulation of the relationship between the microwave magnetic field strength Hac and the SNR in a magnetic recording medium model in which Hk_eff=30 kOe. The SNR was increased both in the single-track recording and the three-track recording with the increasing microwave magnetic field strength Hac in a region where the microwave magnetic field strength Hac is lower than or equal to 2000 Oe. In a region where the microwave magnetic field strength Hac exceeds 2000 Oe, the value of the SNR was substantially fixed in the single-track recording. In contrast, the SNR was slightly decreased when the microwave magnetic field strength Hac has a value of 3000 Oe and the SNR was greatly decreased when the microwave magnetic field strength Hac has a value of 3500 Oe in the three-track recording. This may be because the microwave magnetic field strength Hac having a value that exceeds 3000 Oe causes the magnetization reversal probability of the magnetic particles to be increased to increase the recording track width.

Figure 10:
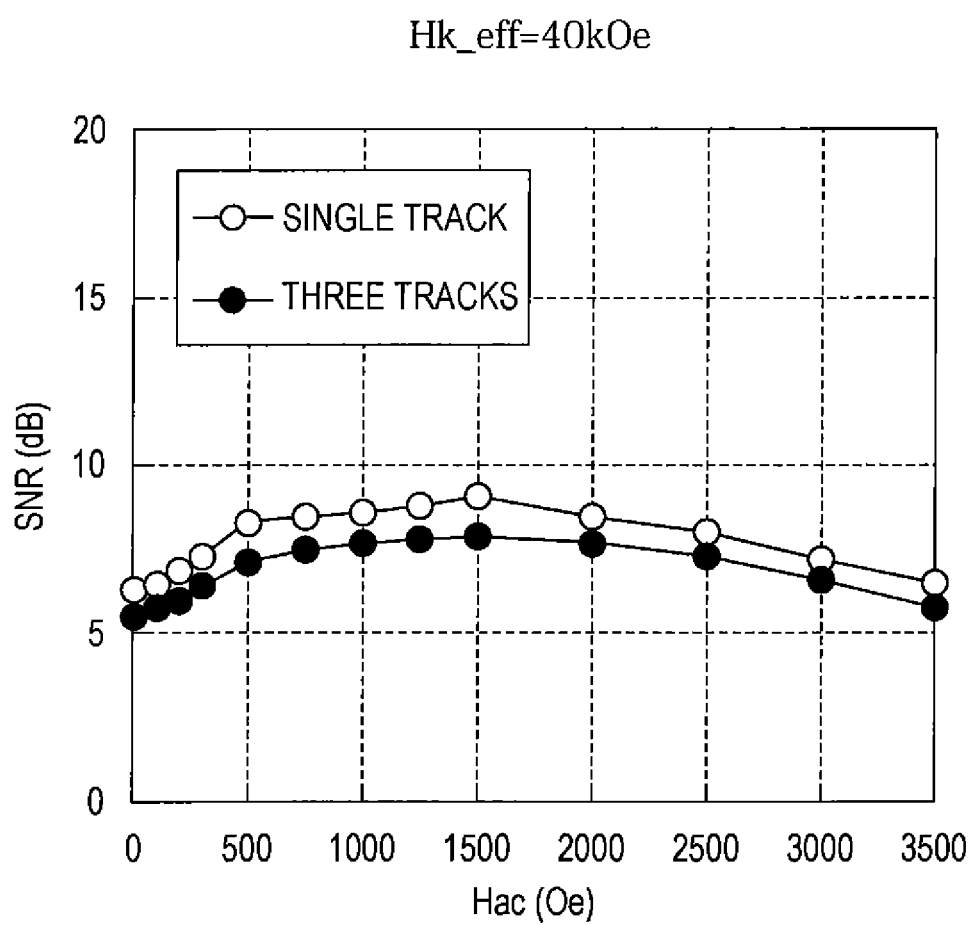
FIG. 10 is a graph illustrating a result of simulation (Hk_eff=40 kOe) of the SNR when the microwave magnetic field strength Hac is varied.

FIG. 10 is a graph illustrating a result of simulation of the relationship between the microwave magnetic field strength Hac and the SNR in a magnetic recording medium model in which Hk_eff=40 kOe. The SNR was lower than 10 dB regardless of the value of the microwave magnetic field strength Hac and the magnetic transition might not be sufficiently formed. This may be because the recording magnetic field strength of the magnetic head is insufficient for the effective magnetic anisotropy field Hk_eff of the recording layer 36 not to achieve the microwave assist effect.

When the relationship between the microwave magnetic field strength Hac and the effective magnetic anisotropy field Hk_eff meets the equation (2), the range of the effective magnetic anisotropy field Hk_eff of the recording layer 36 in which the SNR is improved in response to the application of the microwave was 10 kOe to 30 kOe. In this range of the effective magnetic anisotropy field Hk_eff, the SNR was greatly improved with respect to the SNR when Hac=0. When Hk_eff=8 kOe, the anisotropy energy of the recording layer 36 was insufficient not to form the magnetization reversal due to the effect of the thermal fluctuation and the SNR was hardly improved in response to the application of the microwave. When Hk_eff=40 kOe, the magnetic field strength of the head was insufficient and the improvement effect of the SNR was not achieved in response to the application of the microwave.

The magnetic recording and reproducing apparatus of the embodiments is capable of high-density recording and reproduction, which is difficult to realize in the recording method in the related art, and is useful for bulk storages in information and communication industries.

What is claimed is:

1. A magnetic recording and reproducing apparatus comprising:
   a magnetic recording medium including a recording layer in which at least two magnetic layers are layered on a non-magnetic substrate; and
   a magnetic head including a main magnetic pole for applying a recording magnetic field in a direction substantially perpendicular to a recording face of the magnetic recording medium and a microwave generating element that generates a microwave magnetic field,
   wherein, relationship between a thickness Ts of a magnetic layer having a lowest magnetic anisotropy energy among the at least two magnetic layers composing the recording layer of the magnetic recording medium, and a thickness Tt of the recording layer is Ts/Tt≤0.2, and
   wherein the microwave generating element has a width broader than a width of the main magnetic pole of the magnetic head, so that the microwave generating element applies the microwave magnetic field having a width broader than the width of the recording magnetic field generated by the main magnetic pole of the magnetic head to the magnetic recording medium.

2. The magnetic recording and reproducing apparatus according to claim 1,
   wherein the microwave generating element is a strip line a width of which at a tip at a medium opposing face side in a track width direction is longer than a width of the main magnetic pole in the track width direction.

3. The magnetic recording and reproducing apparatus according to claim 1,
   wherein relationship between a microwave magnetic field strength Hac at a position corresponding to a center position of a trailing end of the main magnetic pole at a center position of the recording layer in a thickness direction and an effective magnetic anisotropy field Hk_eff of the recording layer is Hac≤Hk_eff/10.

4. The magnetic recording and reproducing apparatus according to claim 1,
   wherein an effective magnetic anisotropy field Hk_eff of the recording layer of the magnetic recording medium is 10 kOe≤Hk_eff≤30 kOe.

* * * * *